Patented Apr. 25, 1939

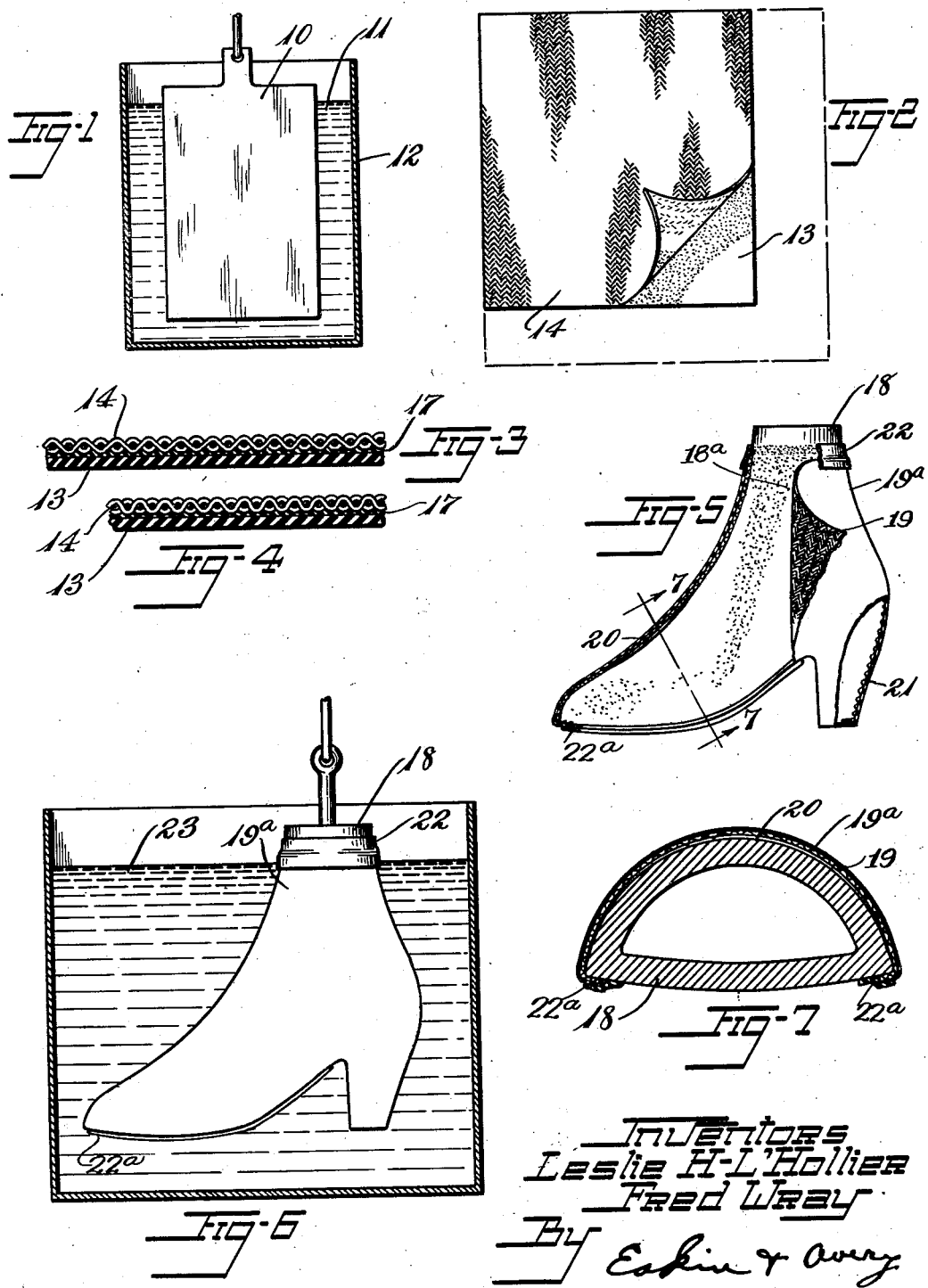

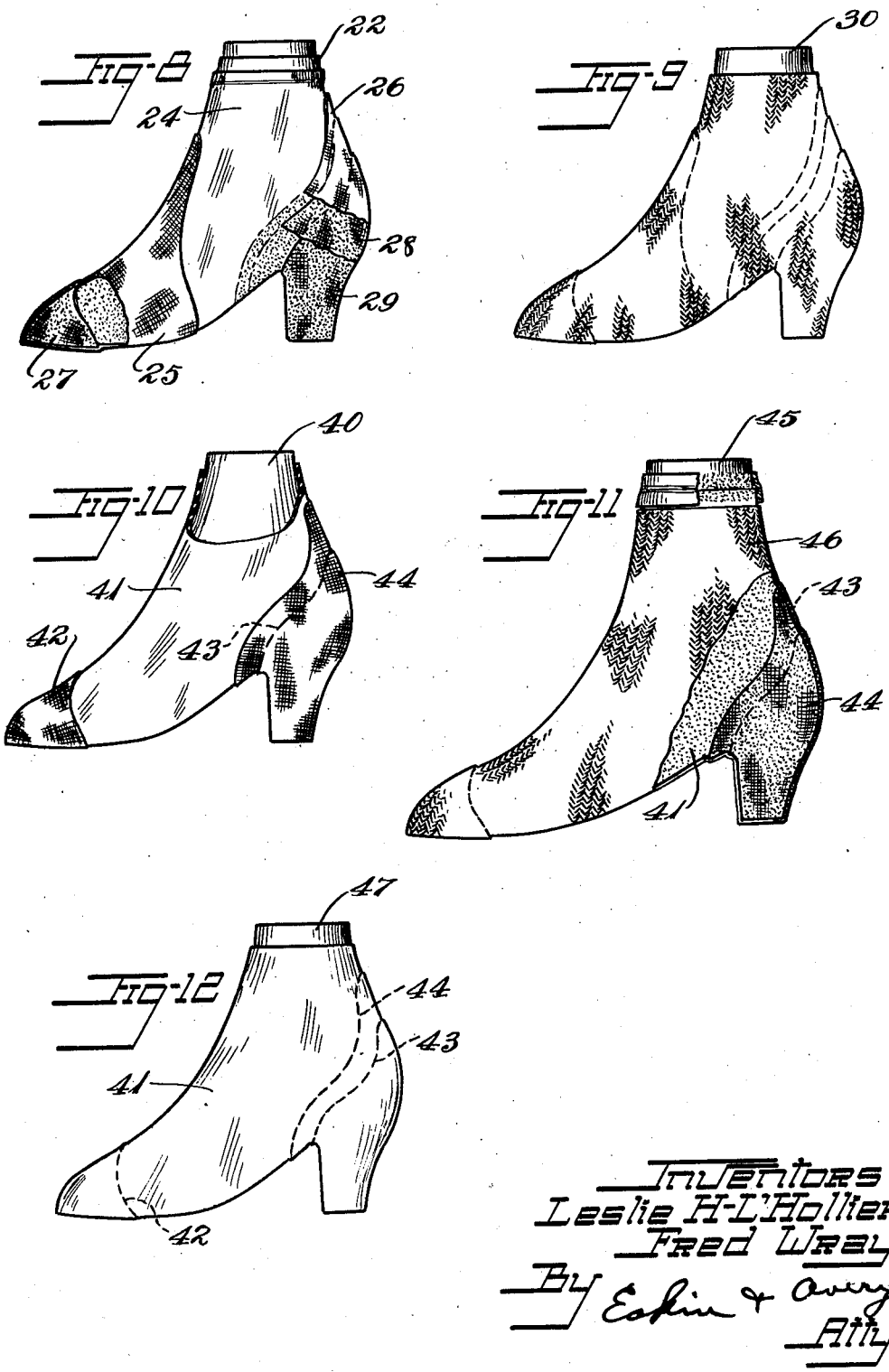

2,155,597

UNITED STATES PATENT OFFICE 2,155,597

METHOD OF REDUCING THE AREA OF FABRICS AND MAKING ARTICLES THEREFROM

Leslie H. L'Hollier, Waltham, and Fred Wray, Watertown, Mass., assignors to Hood Rubber Company, Inc., Watertown, Mass., a corporation of Delaware Application July 3, 1935, Serial No. 29,680

2 Claims. (Cl. 12—142)

This invention relates to methods of reducing the normal area of a sheet of fabric to increase the extensibility of the fabric per unit of length over that which is found in the same material normally and to methods of making articles therefrom.

The principal objects of the invention are to impart greater extensibility to the material per unit of length than is found in the same material normally and to facilitate procedure in the manufacture of articles therefrom.

Other objects will appear from the following description and the accompanying drawings.

Of the drawings:

Fig. 1 is an elevation partly in section showing the production of a rubber film upon a form by deposit from a dispersion of a rubber composition in the practice of the invention in its preferred form.

Fig. 2 illustrates the shrinking of a layer of fabric and the rubber coating, the fabric and rubber being separated at one corner for better illustration.

Fig. 3 is a cross-sectional view of the plied material prior to the shrinking step.

Fig. 4 is a similar illustration of the plied material after shrinkage has taken place.

Fig. 5 is an illustration of the application of the method to the building of a rubber and fabric shoe, showing unshrunken material applied loosely over a shoe last.

Fig. 6 is a view showing the depositing of a rubber film over the assembled last and fabric material, the container for the rubber dispersion being shown in section.

Fig. 7 is a cross-sectional view taken on line 7—7 of Fig. 5.

Fig. 8 shows the last of Figs. 5 and 7 with lining and reinforcing elements applied over the shrunken fabric, parts being broken away.

Fig. 9 shows the shoe reversed and applied over a last in the reversed condition.

Fig. 10 illustrates a modified form of procedure and shows a last having a rubber coating and reinforcing elements applied thereto.

Fig. 11 shows the shoe parts of Fig. 10 reversed and stretched over a larger last and a fabric lining and reinforcements applied thereto.

Fig. 12 shows the shoe removed from the large last and replaced on a last of the original size, where the shoe is completed.

The invention broadly comprises the reduction of the normal area of textile material by adhesively applying to at least one face thereof a layer of unvulcanized rubber composition while the rubber composition is in an abnormally extended condition and then permitting the rubber to recover at least nearly its normal dimensions and thereby compacting the attached fabric layer.

In the preferred form of the invention, as illustrated by Figs. 1 to 4, this is accomplished by utilizing a layer of freshly deposited rubber obtained by deposit from a natural or artificial dispersion of a rubber composition, the rubber being applied to the fabric before the rubber has lost all of its dispersing medium and before natural shrinkage or contraction due to loss of such dispersing medium.

In the modified form of the invention, as illustrated by Figs. 10 to 12, a similar result is accomplished by utilizing a layer of rubber composition which has been stretched to increase its area before the fabric is applied thereto.

Referring to the drawings, the numeral 10 designates a plate of material immersed in a natural or artificial dispersion 11 of a rubber composition, contained in a tank 12. The plate 10, when removed from the dispersion, carries a layer 13 of deposited rubber composition. This layer may be obtained simply by dipping the plate into the dispersion, or by electro deposit or coagulant action, as is well understood in the art. If the layer of rubber 13 is removed from one face of the plate, so as not to be restrained, before it has lost all of the dispersing medium, it will undergo a reduction in area, due to shrinkage of the rubber resulting from the departure of the dispersing medium in it by drying while it is thus unrestrained by plate friction or adhesion.

If a layer of fabric 14 is adhesively applied to one face of the layer 13 of rubber before shrinkage takes place in the rubber, the shrinkage of the rubber layer will correspondingly reduce the area of the fabric, this reduction being considerable, the full shrinkage of the rubber being resisted only by the compacting of the fabric. The reduction in area is illustrated in Fig. 2, where the dot and dash line indicates the original extent of the plied rubber and fabric and the full lines define the final area. The reduction in area of the fabric is made possible by the increased crimping and count of the fabric as illustrated in Figs. 3 and 4, and as shown in Fig. 4, the reduction effected by the shrinkage is not so great as to cause objectionable wrinkles in the material.

To facilitate adhesion of the rubber and fabric, a thin, though not necessarily continuous, layer 17 of rubber composition may be provided on the face of the fabric before the fabric is applied to the layer 13.

Where great extensibility of the plied material is desired it is possible to use knitted materials for the fabric layer, the wales and courses of yarn being more compactible into close order than woven fabrics and also having more inherent elasticity and extensibility.

The principle of the invention is especially useful in the manufacture of shoes of rubber and fabric, where great elasticity of the upper is desirable to provide close conformity to the foot. In practicing the invention in the making of a shoe, a last 18 is first given a light coating 18a of adhesive. An upper 19 of fabric is then loosely assembled about the last. The upper comprises vamp and quarters cut from either woven or knitted fabric and may have a thin coating 19a of rubber on the outer faces thereof not contacting with the last. No attempt to roll the upper to the last is made, the parts being merely adhered to the last at the seams. Where the last is generally concave, such at at 20 and 21, the fabric may bridge concavities, as seen in Fig. 5. The upper edges of the shoe upper 19 may be held in place on the last by tape 22, and similar tapes 22a in addition to the adhesive 18a may be applied along the sole where the upper overlaps the bottom face of the last.

The last with the upper 19 thereon is now immersed (Fig. 6) in a dispersion 23 of rubber composition, whereby a coating 24 of deposited rubber is applied over the upper.

The coating 24 is now permitted to dry while the article is on the last and the shrinkage thereof causes the fabric upper 19 to be reduced in superficial area to an extent dependent upon the looseness of the fit of the fabric upon the last and the restraining action of the tape bindings 22 and 22a, thereby increasing the extensibility of the upper.

The loose fit of the upper 19 on the last is preferably such as to permit such reduction in area and to permit the upper to become closely conformed to the last with a good fit without objectionable slackness or wrinkles. Reinforcing elements 25, 26, 27, 28 and 29 may now be applied as desired (Fig. 8). The article is then removed from the last, this being accomplished preferably by cutting away the rubber deposit across the sole and removing the last, sole first. Then the article is reversed, so as to bring the fabric layer 19 on the outside, and slipped over another last 30, (Fig. 9), where the shoe may be completed by applying a sole and other parts thereof.

In practicing the modified method, a last 40 (Fig. 10) corresponding in size to the desired shoe, is first provided with a layer of rubber 41, preferably by deposit from a natural or artificial dispersion of a rubber composition. Reinforcements 42, 43, 44 may then be applied. Thereafter, the rubber layer 41, with the reinforcements, where these are employed, is removed from the last 40 and stretched over a larger last 45 (Fig. 11) to form the upper of the shoe. A lining 46 of woven or knitted fabric is then applied over the rubber layer 41, with as little stretching as possible, and rolled into adhesive contact with the rubber upper. The entire upper is then removed from last 45 and the recovery of the rubber upper 41 causes a shrinking of the lining. The upper is then reversed and placed over a last 47 (Fig. 12) having the same size as the last 40 and the shoe is completed by applying the sole and other elements.

Obviously, other articles may be made in similar manner. The resulting articles will have greater extensibility than an article built of the same materials in the ordinary way.

We claim:

1. The method of making stretchable composite sheet material which comprises adhesively uniting directly to a face of a fabric a layer of unvulcanized water-containing rubber composition freshly deposited from a water dispersion thereof, and effecting shrinkage of the rubber layer by drying it while the fabric is permitted to contract to undergo a substantial reduction of area by the compacting action of the shrinking rubber to provide stretchability of the composite materials at least commensurate with the said reduction of area.

2. The method of making a stretchable shoe or the like which comprises positioning upon a form a fabric upper structure of knitted or the like highly stretchable and compactible quality, said structure being positioned on the form in a loose condition such that a substantial reduction in area of the fabric upper is required to fit it to the form, applying directly to the fabric a liquid rubber dispersion to provide a liquid-containing rubber coating thereon, and effecting shrinkage of the rubber coating by drying it to fit the fabric to the form by compacting it as a result of the shrinkage of the rubber during the drying.

LESLIE H. L'HOLLIER.
FRED WRAY.